US010054951B2

(12) United States Patent
Liu et al.

(10) Patent No.: US 10,054,951 B2
(45) Date of Patent: Aug. 21, 2018

(54) MOBILE ROBOT INDOOR LOCALIZATION AND NAVIGATION SYSTEM AND METHOD

(71) Applicant: FUJI XEROX CO., LTD., Tokyo (JP)

(72) Inventors: Qiong Liu, Cupertino, CA (US); Shang Ma, Irvine, CA (US); Sven Kratz, San Jose, CA (US)

(73) Assignee: FUJI XEROX CO., LTD., Tokyo (JP)

( * ) Notice: Subject to any disclaimer, the term of this patent is extended or adjusted under 35 U.S.C. 154(b) by 19 days.

(21) Appl. No.: 15/164,598

(22) Filed: May 25, 2016

(65) Prior Publication Data

US 2017/0344017 A1    Nov. 30, 2017

(51) Int. Cl.
*G05D 1/02* (2006.01)
*G05D 1/00* (2006.01)

(52) U.S. Cl.
CPC ......... *G05D 1/0234* (2013.01); *G05D 1/0088* (2013.01); *G05D 1/0212* (2013.01); *Y10S 901/01* (2013.01)

(58) Field of Classification Search
None
See application file for complete search history.

(56) References Cited

U.S. PATENT DOCUMENTS 5,525,883 A * 6/1996 Avitzour .............. G05D 1/0274
                                             318/568.1
7,720,554 B2 * 5/2010 DiBernardo ............ G01S 5/163
                                             356/139.03

(Continued)

FOREIGN PATENT DOCUMENTS

JP   2008225837 A    9/2008

OTHER PUBLICATIONS

Osswald, S., et al. Learning reliable and efficient navigation with a humanoid. In Robotics and Automation (ICRA), 2010 IEEE International Conference on (pp. 2375-2380). IEEE.

(Continued)

*Primary Examiner* — Redhwan K Mawari
*Assistant Examiner* — Edward Torchinsky
(74) *Attorney, Agent, or Firm* — TransPacific Law Group; Pavel I. Pogodin, Esq.

(57) ABSTRACT

An indoor localization and navigation system for a mobile robot, the system comprising: a projector mounted on the mobile robot and configured to project a temporal projector light signal, wherein the temporal projector light signal is encoded, for each pixel of the projector, with an information segment comprising the pixel coordinates of the each pixel of the projector; a stationary sensor node comprising a light sensor configured to detect the temporal projector light signal and generate a sensor signal and a transmitter configured to transmit a sensor node identifier and a position code generated based on the sensor signal; a receiver mounted on the mobile robot and configured to receive the sensor node identifier and the position code from the transmitter; and an onboard computer mounted on the mobile robot and operatively coupled to the projector and the receiver, wherein the onboard computer is configured to receive the sensor node identifier and the position code from the receiver and to determine a location information of the mobile robot based on the received sensor node identifier and the position code.

20 Claims, 8 Drawing Sheets

(56) References Cited

U.S. PATENT DOCUMENTS

| | | | |
|---|---|---|---|
| 8,594,840 B1 * | 11/2013 | Chiappetta | G05D 1/0225 |
| | | | 700/245 |
| 8,972,052 B2 * | 3/2015 | Chiappetta | G05D 1/0225 |
| | | | 700/245 |
| 9,444,547 B2 * | 9/2016 | Ganick | G06Q 30/02 |
| 2009/0312871 A1 | 12/2009 | Lee | |
| 2013/0245937 A1 * | 9/2013 | DiBernardo | G01S 5/163 |
| | | | 701/514 |
| 2017/0050318 A1 * | 2/2017 | Gutmann | G05D 1/0234 |

OTHER PUBLICATIONS

Suriyon, T., et al. Development of guide robot by using qr code recognition. In The Second TSME International Conference on Mechanical Engineering (vol. 21).
Tsukiyama, I., Aug. 2011. Rfid based navigation system for indoor mobile robots. In World Congress (vol. 18, No. 1, pp. 1084-1089).
Stella, E., et al. Mobile robot navigation using vision and odometry. In Intelligent Vehicles' 94 Symposium, Proceedings of the (pp. 417-422). IEEE.
Takefumi Hiraki, Issei Takahashi, Shotaro Goto, Shogo Fukushima and Takeshi Naemura, "Phygital Field: Integrated Field with Visible Images and Robot Swarm Controlled by Invisible Images," Proceedings, SIGGRAPH '15 ACM SIGGRAPH 2015 Posters, Article No. 85, Los Angeles, California—Aug. 9-13, 2015.

* cited by examiner

MOBILE ROBOT INDOOR LOCALIZATION AND NAVIGATION SYSTEM AND METHOD

BACKGROUND OF THE INVENTION

Technical Field

The disclosed embodiments relate in general to localization and navigation systems and methods and, more specifically, to mobile robot indoor localization and navigation systems and methods.

Description of the Related Art

The usage of autonomous mobile robots for transport of people and goods has increased in recent years. However, real-time localization of the mobile robots, which has been considered as the basis for motion planning and control, is still an unsolved problem given that various factors (e.g. accuracy, resolution, cost, and et al.) post different constraints onto system design and implementation in real world scenarios. On the other hand, most of the robot navigation systems proposed in the published literature are either tailored toward particular structured environments or driven by an overwhelming degree of computational complexity.

In view of the above and other shortcomings of the conventional technology, new and improved systems and methods for robot navigation are needed that can move robots autonomously to a given goal in a quasi-unstructured environment context, where only a limited knowledge of the environment is available.

SUMMARY OF THE INVENTION

The embodiments described herein are directed to systems and methods that substantially obviate one or more of the above and other problems associated with the conventional robot localization and navigation systems.

In accordance with one aspect of the embodiments described herein, there is provided an indoor localization and navigation system for a mobile robot, the system comprising: a projector mounted on the mobile robot and configured to project a temporal projector light signal, wherein the temporal projector light signal is encoded, for each pixel of the projector, with an information segment comprising the pixel coordinates of the each pixel of the projector; a stationary sensor node comprising a light sensor configured to detect the temporal projector light signal and generate a sensor signal and a transmitter configured to transmit a sensor node identifier and a position code generated based on the sensor signal; a receiver mounted on the mobile robot and configured to receive the sensor node identifier and the position code from the transmitter; and an onboard computer mounted on the mobile robot and operatively coupled to the projector and the receiver, wherein the onboard computer is configured to receive the sensor node identifier and the position code from the receiver and to determine a location information of the mobile robot based on the received sensor node identifier and the position code.

In one or more embodiments, the stationary sensor node is rigidly mounted on a ceiling.

In one or more embodiments, the onboard computer of the mobile robot determines the location information of the mobile robot by identifying a projector pixel corresponding to the position code.

In one or more embodiments, the onboard computer of the mobile robot determines the location information of the mobile robot by querying a remote server using the received sensor node identifier and receiving, from the remote server, a node position corresponding to the received sensor node identifier.

In one or more embodiments, the onboard computer of the mobile robot determines the location information of the mobile robot by combining the node position received from the remote server with a second position generated based on the position code.

In one or more embodiments, the sensor node comprises a second light sensor configured to detect the temporal projector light signal and generate a second sensor signal, wherein the transmitter is further configured to transmit a second position code generated based on the second sensor signal and wherein the onboard computer of the mobile robot determines the location information of the mobile robot by identifying a second projector pixel corresponding to the second position code.

In one or more embodiments, the sensor node comprises a second light sensor configured to detect the temporal projector light signal and generate a second sensor signal, wherein the transmitter is further configured to transmit a second position code generated based on the second sensor signal and wherein the onboard computer of the mobile robot determines an orientation information of the mobile robot based on the position code and the second position code.

In one or more embodiments, the temporal projector light signal projected by the project comprises a plurality of sequential light pulses encoding pixel coordinates of the each pixel of the projector.

In one or more embodiments, onboard computer of the mobile robot is configured to calculate a trajectory error of the mobile robot and issue a guidance command based on a proportional-integral-derivative (PID) calculation performed using the calculated trajectory error.

In one or more embodiments, the onboard computer is configured to maintain a map comprising topological relation of a plurality of stationary sensor nodes.

In one or more embodiments, the onboard computer is configured to issue a guidance command based on the map and a goal sequence information.

In one or more embodiments, the goal sequence information comprises an ordered plurality of stationary sensor nodes.

In one or more embodiments, the system further comprises a server executing a global navigation module for building the goal sequence information and transmitting the goal sequence information to the onboard computer of the robot.

In one or more embodiments, the projector and the receiver are positioned on a top of the mobile robot.

In one or more embodiments, the stationary sensor node further comprises a second light sensor configured to detect the temporal projector light signal and generate a second sensor signal and wherein the transmitted position code is additionally based on the second sensor signal.

In one or more embodiments, the stationary sensor node further comprises a third light sensor configured to detect the temporal projector light signal and generate a third sensor signal and wherein the transmitted position code is additionally based on the third sensor signal.

In accordance with another aspect of the embodiments described herein, there is provided an indoor localization and navigation method for a mobile robot, the method comprising: using a projector mounted on the mobile robot to project a temporal projector light signal, wherein the temporal projector light signal is encoded, for each pixel of the projector, with an information segment comprising the pixel coordinates of the each pixel of the projector; using a stationary sensor node comprising a light sensor for detecting the temporal projector light signal and generate a sensor signal and a transmitter for transmitting a sensor node identifier and a position code generated based on the sensor signal; using a receiver mounted on the mobile robot to receive the sensor node identifier and the position code from the transmitter; and using an onboard computer mounted on the mobile robot and operatively coupled to the projector and the receiver, to receive the sensor node identifier and the position code from the receiver and to determine a location information of the mobile robot based on the received sensor node identifier and the position code.

In one or more embodiments, the stationary sensor node is rigidly mounted on a ceiling.

In one or more embodiments, the onboard computer of the mobile robot determines the location information of the mobile robot by identifying a projector pixel corresponding to the position code.

In one or more embodiments, the onboard computer of the mobile robot determines the location information of the mobile robot by querying a remote server using the received sensor node identifier and receiving, from the remote server, a node position corresponding to the received sensor node identifier.

In one or more embodiments, the onboard computer of the mobile robot determines the location information of the mobile robot by combining the node position received from the remote server with a second position generated based on the position code.

In accordance with another aspect of the embodiments described herein, there is provided a computer-readable medium embodying a set of instructions implementing an indoor localization and navigation method for a mobile robot, the method comprising: using a projector mounted on the mobile robot to project a temporal projector light signal, wherein the temporal projector light signal is encoded, for each pixel of the projector, with an information segment comprising the pixel coordinates of the each pixel of the projector; using a stationary sensor node comprising a light sensor for detecting the temporal projector light signal and generate a sensor signal and a transmitter for transmitting a sensor node identifier and a position code generated based on the sensor signal; using a receiver mounted on the mobile robot to receive the sensor node identifier and the position code from the transmitter; and using an onboard computer mounted on the mobile robot and operatively coupled to the projector and the receiver, to receive the sensor node identifier and the position code from the receiver and to determine a location information of the mobile robot based on the received sensor node identifier and the position code.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically.

DETAILED DESCRIPTION

Figure 1A:
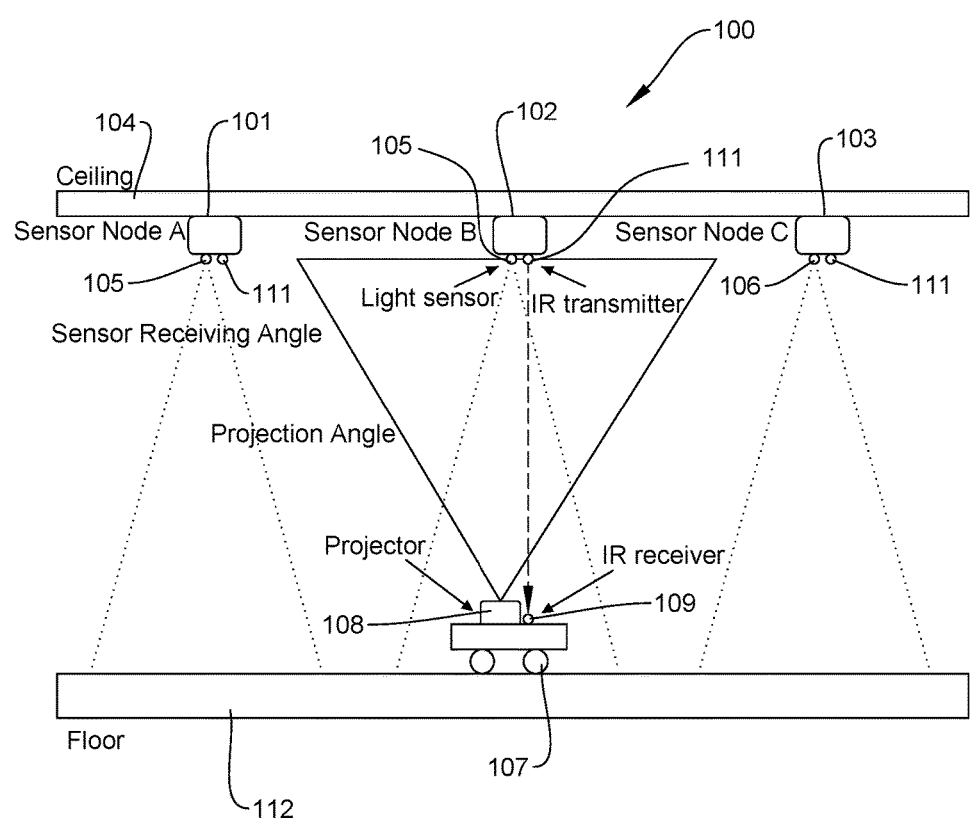
FIG. 1(a) illustrates an exemplary embodiment of a mobile robot indoor localization and navigation system.

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

In accordance with one aspect of the embodiments described herein, there is provided a practical indoor localization and navigation system and method configured to exploit the advantage of global and local positioning strategies. In one embodiment, the main parts of the aforesaid novel system are twofold, including global navigation and local navigation. More specifically, to obtain global position, a stripe of sensor nodes would be deployed on the ceiling in the target environment and a mobile robot would be configured to determine which region it belongs to by projecting light onto the ceiling and activating different sensor nodes of the stripe. Each sensor node is equipped with light sensors and infrared transmitters and both its unique identifier (ID) and position in real-world coordinates have been pre-stored in a networked database as a key-value pair. Once the sensor node is activated, it will send its IDs to the robot through the infrared (IR) channel. Finally, the robot is configured to locate itself by receiving the ID and obtaining the associated global location in the data center through the WiFi or Bluetooth communication.

In one or more embodiments, a topological relation map which shows the connection of scattered landmarks through the environment is also used and a global navigation module running on the server is configured to generate desirable path directing the robot to a goal based on the real-time location of the robot. Meanwhile, coded light mechanism is used to provide information of the orientation and exact position of the robot inside the region to which the robot belongs and navigate the robot from region to region.

By combining region detection from artificial landmarks, the sensor nodes in an embodiment of the described system, and fine positioning from the coded light, the embodiment of the described system compensates for the disadvantages of the conventional localization techniques and, as such, may be used for various localization and navigation applications with different requirements as to the accuracy and resolution.

In one or more embodiments, the described localization and navigation system utilizes coded light to provide both coarse- and fine-grained real-time indoor location information of a mobile robot. FIG. 1(a) illustrates an exemplary embodiment of a mobile robot indoor localization and navigation system 100. As shown in FIG. 1(a), a strip of sensor nodes 101, 102 and 103 are embedded on the ceiling 104 for a given scenario. Each sensor node 101-103 contains two light sensors 105 and 106 and one IR transmitter 111. It should be noted that while in the described exemplary embodiment the sensor nodes 101-103 incorporate two light sensors 105 and 106, the invention is not limited to any specific number of light sensors per sensor node. In various embodiment, the described system may incorporate 1, 2, 3, 4 or more light sensors per sensor node. Therefore, the number of light sensors should not be considered to be limiting the scope of the described embodiments.

At the initial state, all sensor nodes 101, 102 and 103 are configured to be in sleep mode. A mobile robot 107 equipped with a projector 108 and an IR receiver 109 is navigated on the ground 112 in the given setup. Once started, the projector 108 on the robot 107 is configured to periodically project a sequence of gray code images to the ceiling 104. A sensor node 101, 102 or 103 would be activated when the light sensor 105 and/or 106 (and/or any additional light sensors) on it detects the change of light intensity with certain frequency (for example 4 kHz). Then the sensor node 101, 102 or 103 will send its ID and its pixel position inside the projection area back to the robot 107 through the IR channel. Since these sensor nodes 101, 102 and 103 divide the coverage of this system into different regions and the ID of each sensor node is unique and associated with a global location which has been collected beforehand, the robot 107 would query a networked database (not shown) for the associated global location after it receives the ID from a sensor node 101, 102 or 103, and combine this global data with the local pixel position it receives to form a final location.

Figure 1B:
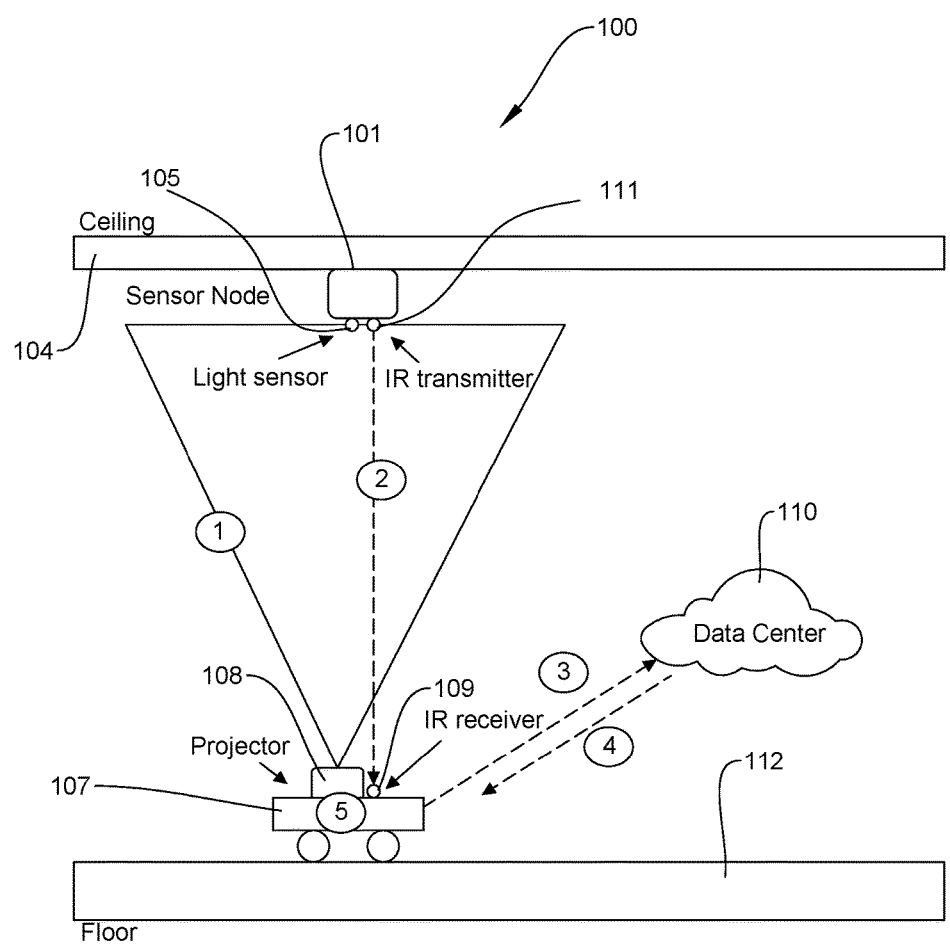
FIG. 1(b) illustrates one specific example of a process for determining one pair of robot locations (both coarse- and fine-grained) using the mobile robot indoor localization and navigation system.
Figure 1C:
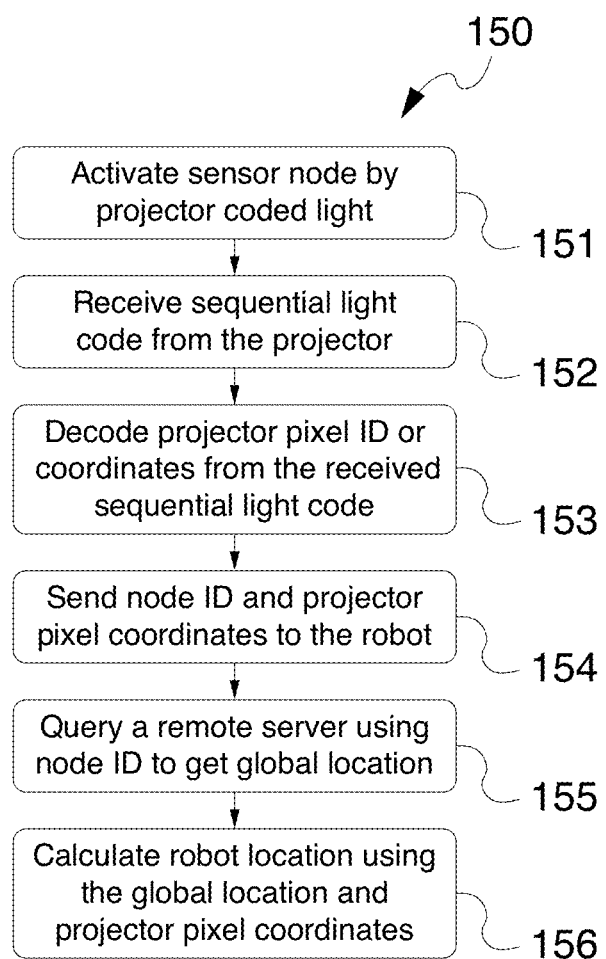
FIG. 1(c) illustrates a block diagram of an exemplary operating sequence of a process for determining one pair of robot locations (both coarse- and fine-grained) using the mobile robot indoor localization and navigation system.

FIG. 1(b) illustrates one specific example of a process for determining one pair of robot 107 locations (both coarse- and fine-grained) using the mobile robot indoor localization and navigation system 100. On the other hand, FIG. 1(c) illustrates a block diagram of an exemplary operating sequence 150 of a process for determining one pair of robot 107 locations (both coarse- and fine-grained) using the mobile robot indoor localization and navigation system 100.

First, the sensor node 101-103 on the ceiling 104 is activated by the projected coded light from the projector 108 mounted on the mobile robot 107, see step 151 of process 150. Then, the particular light sensor 105 and/or 106 of the corresponding node 101-103 would receive a sequence of code carried by the projected light, which determines the relative location of the receiving light sensor 105 or 106 inside the projection area of the robot-mounted projector 108, see step 152 of the process 150. To decode this relative location, the projector pixel ID or coordinates are decoded from the output of the light sensors 105 or 106, because the location of each pixel in the light signal pattern projected by the projector 108 is predefined, see step 153 of the process 150.

After that, the sensor node 101, 102 or 103 would send its ID and the relative location with respect to the robot-mounted projector 108 decoded from the projected light intensity variations by the light sensors 105 and/or 106 back to the robot 107, see step 154. With this node ID information, the robot 107 is configured to query, via a wireless network, such as WIFI or Bluetooth, a networked data center 110 to obtain the associated global location information for this particular ID, see step 155 of the process 150. With the global location information, the robot 107 will know to which region it belongs, which gives the robot 107 the coarse location information. In addition, with the relative pixel position, the robot 107 will have fine position information inside this region, see step 156 of the process 150 in FIG. 1(c).

Figure 2A:
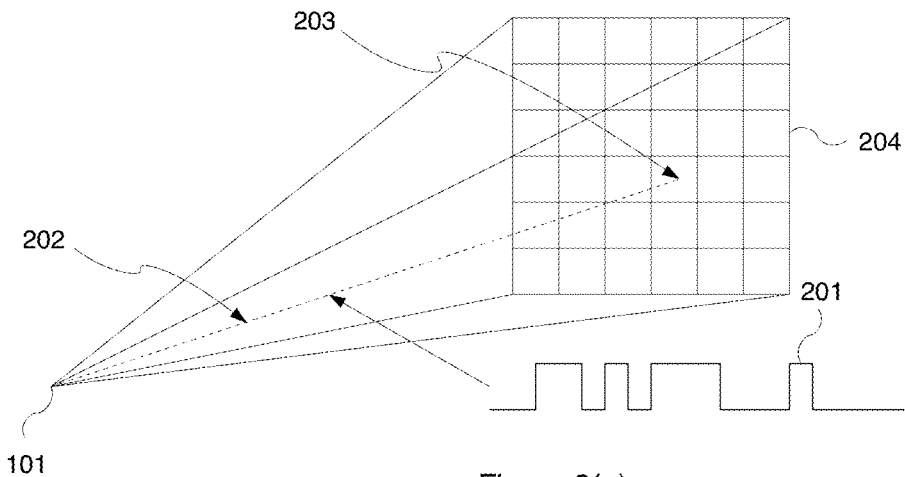
FIGS. 2(a) and 2(b) illustrate two temporal coded light signals produced by the projector.
Figure 2B:
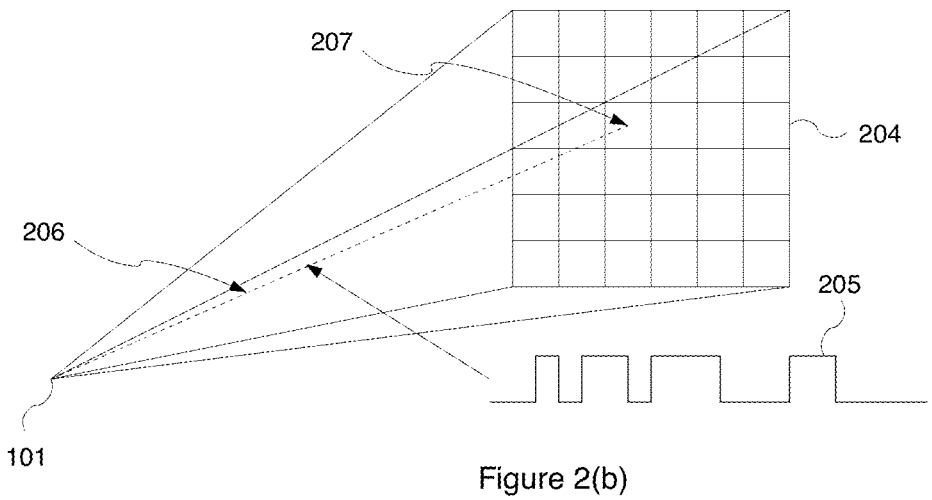

FIGS. 2(a) and 2(b) illustrate two temporal coded light signals 201 and 205 produced by the projector 108. In one embodiment, the projector 108 is a DLP projector, well known to persons of ordinary skill in the art. The temporal light signals 201 and 205 correspond to two different pixels 203 and 207 of the projector 108. The temporal light signal 201 propagating in the direction 202 is encoded with unique position information of the first projector pixel 203 using a corresponding first unique sequence of temporal light pulses. On the other hand, the temporal light signal 205 propagating in the direction 206 is encoded with unique position information of the second projector pixel 207 using a corresponding second unique sequence of temporal light pulses. In FIGS. 2(a) and 2(b) the projector pixels 203 and 207 are illustrated by their corresponding projections and on an imaginary projection surface 204. The aforesaid first and second sequences of light pulses are different and carry information about the respective projector pixel.

Figure 3:
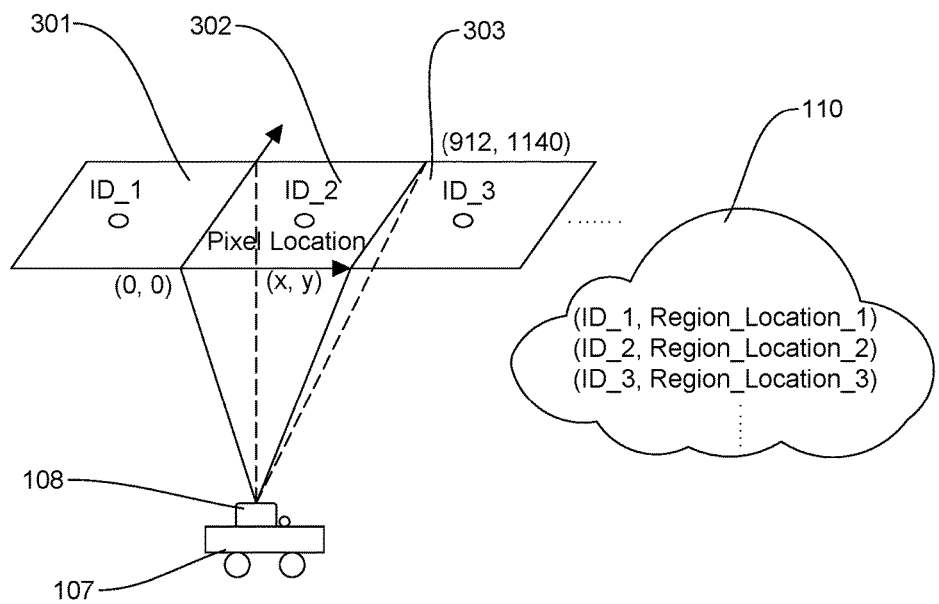
FIG. 3 demonstrates that the final location data for the robot is a combination of region information based on sensor node's ID, which uniquely identifies one of the regions corresponding to the identifiers ID_1, ID_2 and ID_3, respectively, and a pixel-level location (x,y) within the region based on the position of the sensor node inside the projection area of the robot-mounted projector.

FIG. 3 demonstrates that the final location data for the robot 107 is a combination of region information based on sensor node's ID, which uniquely identifies one of the regions 301, 302 or 303 corresponding to the identifiers ID_1, ID_2 and ID_3, respectively, and a pixel-level location (x,y) within the region based on the position of the sensor node 101, 102 or 103 inside the projection area of the robot-mounted projector 108. The region information (e.g. region ID) provides coarse robot localization in the space, while the pixel-level location information provides fine robot positioning.

Figure 4:
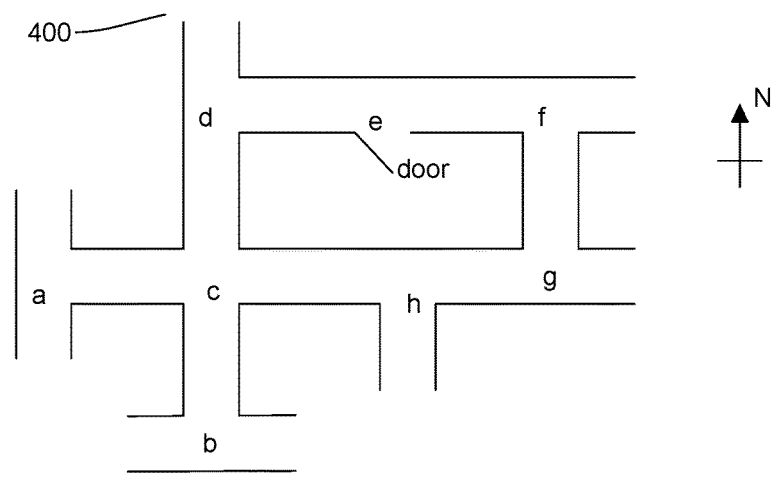
FIG. 4 illustrates an exemplary embodiment of a world map maintained by the robot.
Figure 4:
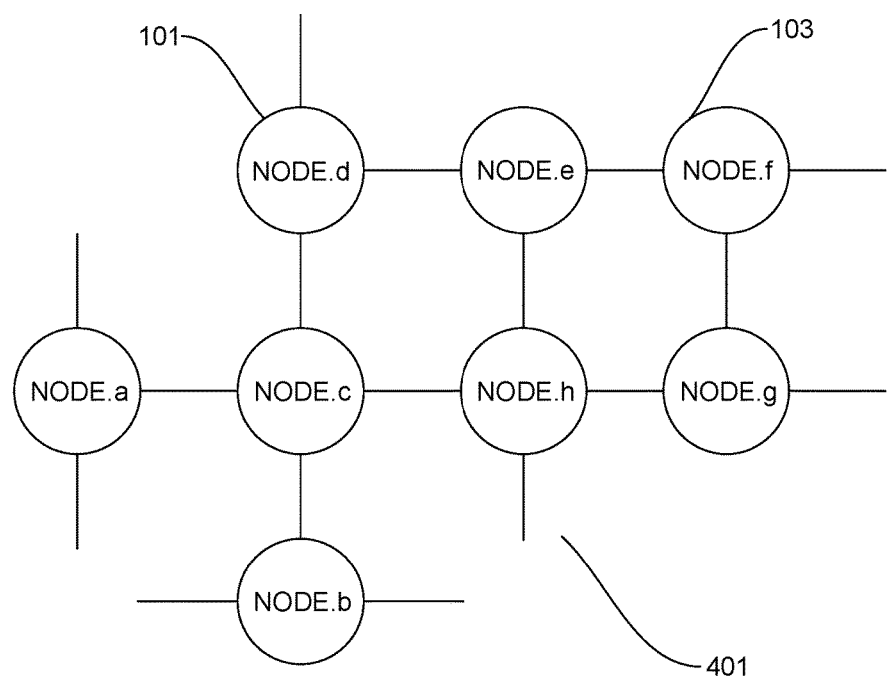

In addition, in one or more embodiments, the system 100 also maintains a world map 401, an exemplary embodiment of which is shown in FIG. 4. As shown in FIG. 4, the world map 401 corresponds to a floor plan 400. The world map 401 shows the topological relation of sensor nodes 101, 102 and 103 in the target area. In one or more embodiments, the world map 401 is used by the global navigation module running on a server for building a sequence of sub-goals to a given goal. For a given starting point and a goal, the aforesaid global navigation module running on the server will generate a suitable path for robot 107, consisting of a sequence of sensor nodes (101, 102 and 103) which the robot 107 should find on that path and a series of actions the robot 107 should take at different sensor nodes 101, 102 and 103.

Figure 5:
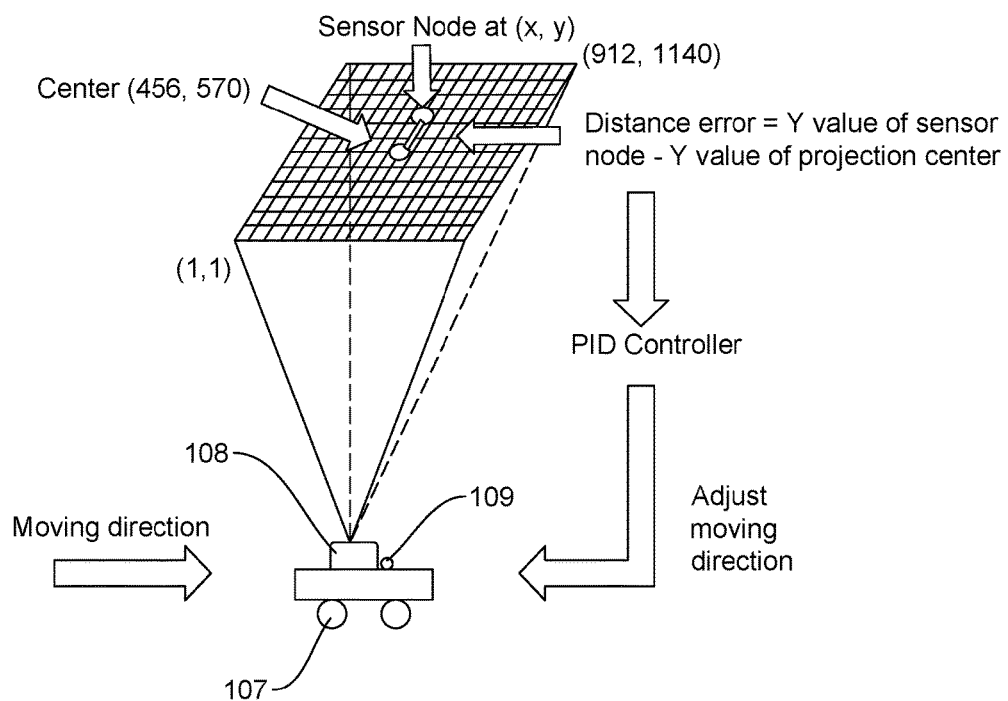
FIG. 5 illustrates how the error in the robot trajectory may be calculated and corrected.

For example, in order to navigate the robot from "a" to "f", the global navigation module might give a path like "a-c-h-g-f". This means that the robot should first find the sensor node a, go straight, then find node c, keep straight, then find node h, keep straight, then find node g, turn left, go straight, and finally find f. During the motion between any two sub-goals, coded light system will be used to make sure the robot is moving right on the path. However, many factors, such as slip, unequal motors, and more would make the robot 107 off the path resulting in error. In one or more embodiments, the offset between the desired path and the real path of the robot 107 can be fed into a proportional-integral-derivative controller (PID controller) for error correction. FIG. 5 illustrates how the error in the robot 107 trajectory may be calculated and corrected.

Specifically, as shown in FIG. 5, the distance error along Y axis is calculated as a difference between the Y value of the sensor node and Y value of the projection center. The aforesaid Y error value represents the deviation of the robot 107 from the center of the node along the Y axis. This error value is subsequently fed into the PID controller, which sends an appropriate command to the robot drive system to adjust for the error.

Exemplary Embodiments of Onboard Computer System

Figure 6:
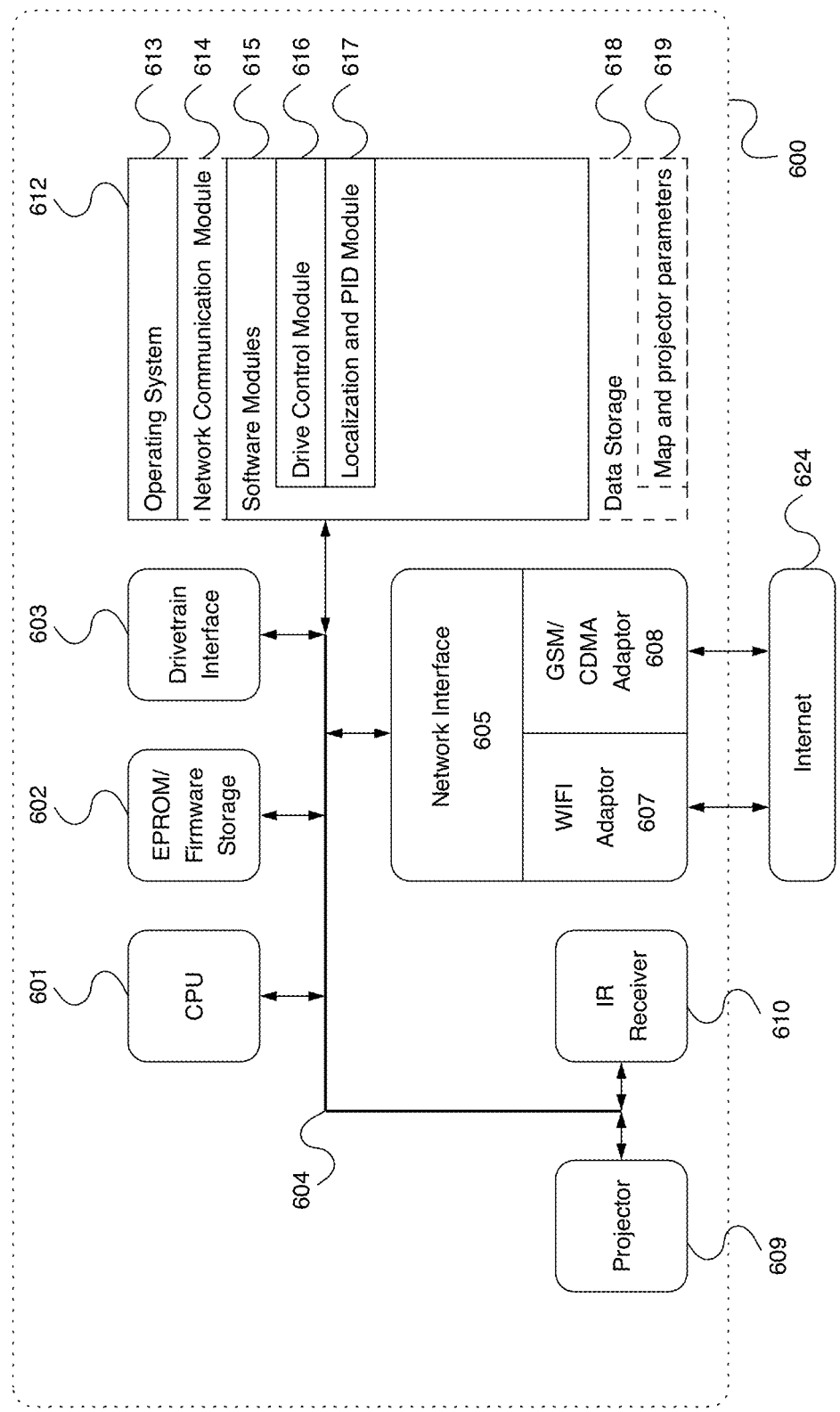
FIG. 6 illustrates an exemplary embodiment of an onboard computer of the robot, which may be used to implement the techniques described herein.

FIG. 6 illustrates an exemplary embodiment of an onboard computer 600 of the robot 107, which may be used to implement the techniques described herein. In one or more embodiments, the onboard computer 600 may be implemented within the form factor of a mobile computing device well known to persons of skill in the art. In an alternative embodiment, the onboard computer 600 may be implemented based on a laptop or a notebook computer. Yet in an alternative embodiment, the onboard computer 600 may be a specialized computing system, especially designed for the drone, robot or car.

The onboard computer 600 may include a data bus 604 or other interconnect or communication mechanism for communicating information across and among various hardware components of the onboard computer 600, and a central processing unit (CPU or simply processor) 601 coupled with the data bus 604 for processing information and performing other computational and control tasks. The onboard computer 600 also includes a memory 612, such as a random access memory (RAM) or other dynamic storage device, coupled to the data bus 604 for storing various information as well as instructions to be executed by the processor 601. The memory 612 may also include persistent storage devices, such as a magnetic disk, optical disk, solid-state flash memory device or other non-volatile solid-state storage devices.

In one or more embodiments, the memory 612 may also be used for storing temporary variables or other intermediate information during execution of instructions by the processor 601. Optionally, onboard computer 600 may further include a read only memory (ROM or EPROM) 602 or other static storage device coupled to the data bus 604 for storing static information and instructions for the processor 601, such as firmware necessary for the operation of the onboard computer 600, basic input-output system (BIOS), as well as various configuration parameters of the onboard computer 600.

In one or more embodiments, the onboard computer 600 may additionally incorporate projector 609 and IR receiver 610 for projecting the coded light signal and for receiving information from the nodes 101-103. In addition, the onboard computer 600 may incorporate a drivetrain interface 603 for controlling drivetrain of the robot.

In one or more embodiments, the onboard computer 600 may additionally include a communication interface, such as a network interface 605 coupled to the data bus 604. The network interface 605 may be configured to establish a connection between the onboard computer 600 and the Internet 4 using at least one of WIFI interface 607 and the cellular network (GSM or CDMA) adaptor 608. The network interface 605 may be configured to provide a two-way data communication between the onboard computer 600 and the Internet 624. The WIFI interface 607 may operate in compliance with 802.11a, 802.11b, 802.11g and/or 802.11n protocols as well as Bluetooth protocol well known to persons of ordinary skill in the art. In an exemplary implementation, the WIFI interface 607 and the cellular network (GSM or CDMA) adaptor 608 send and receive electrical or electromagnetic signals that carry digital data streams representing various types of information.

In one or more embodiments, the Internet 624 typically provides data communication through one or more sub-networks to other network resources. Thus, the onboard computer 600 is capable of accessing a variety of network resources located anywhere on the Internet 624, such as remote media servers, web servers, other content servers as well as other network data storage resources. In one or more embodiments, the onboard computer 600 is configured send and receive messages, media and other data, including application program code, through a variety of network(s) including Internet 624 by means of the network interface 605. In the Internet example, when the onboard computer 600 acts as a network client, it may request code or data for an application program executing in the onboard computer 600. Similarly, it may send various data or computer code to other network resources.

In one or more embodiments, the functionality described herein is implemented by onboard computer 600 in response to processor 601 executing one or more sequences of one or more instructions contained in the memory 612. Such instructions may be read into the memory 612 from another computer-readable medium. Execution of the sequences of instructions contained in the memory 612 causes the processor 601 to perform the various process steps described herein. In alternative embodiments, hard-wired circuitry may be used in place of or in combination with software instructions to implement the embodiments of the invention. Thus, embodiments of the invention are not limited to any specific combination of hardware circuitry and software.

The term "computer-readable medium" as used herein refers to any medium that participates in providing instructions to processor 601 for execution. The computer-readable medium is just one example of a machine-readable medium, which may carry instructions for implementing any of the methods and/or techniques described herein. Such a medium may take many forms, including but not limited to, non-volatile media and volatile media.

Common forms of non-transitory computer-readable media include, for example, a floppy disk, a flexible disk, hard disk, magnetic tape, or any other magnetic medium, a CD-ROM, any other optical medium, punchcards, paper-tape, any other physical medium with patterns of holes, a RAM, a PROM, an EPROM, a FLASH-EPROM, a flash drive, a memory card, any other memory chip or cartridge, or any other medium from which a computer can read. Various forms of computer readable media may be involved in carrying one or more sequences of one or more instructions to processor 601 for execution. For example, the instructions may initially be carried on a magnetic disk from a remote computer. Alternatively, a remote computer can load the instructions into its dynamic memory and send the instructions over the Internet 624. Specifically, the computer instructions may be downloaded into the memory 612 of the onboard computer 600 from the foresaid remote computer via the Internet 624 using a variety of network data communication protocols well known in the art.

In one or more embodiments, the memory 612 of the onboard computer 600 may store any of the following software programs, applications and/or modules:

1. Operating system (OS) 613, which may be a mobile operating system for implementing basic system services and managing various hardware components of the onboard computer 600. Exemplary embodiments of the operating system 613 are well known to persons of skill in the art, and may include any now known or later developed mobile operating systems. Additionally provided may be a network communication module 614 for enabling network communications using the network interface 605.

2. Software modules 615 may include, for example, a set of software modules executed by the processor 601 of the onboard computer 600, which cause the onboard computer 600 to perform certain predetermined functions, such as issue commands to the drivetrain of the robot 107, see, for example, a drive control module 616 and a localization and PID module 617.

3. Data storage 618 may be used, for example, for storing the world map as well as the parameters of the robot-mounted projector 108, see parameter and map store 619.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, Objective-C, perl, shell, PHP, Java, as well as any now known or later developed programming or scripting language.

Moreover, other implementations of the invention will be apparent to those skilled in the art from consideration of the specification and practice of the invention disclosed herein. Various aspects and/or components of the described embodiments may be used singly or in any combination in the mobile robot indoor localization and navigation system. It is intended that the specification and examples be considered as exemplary only, with a true scope and spirit of the invention being indicated by the following claims.

What is claimed is:

1. An indoor localization and navigation system for a mobile robot, the system comprising:
    a. a projector comprising a plurality of pixels, the projector mounted on the mobile robot and configured to project a temporal projector light signal, wherein the temporal projector light signal is encoded, for each pixel of the projector, with an information segment comprising the pixel coordinates of the each pixel of the projector;
    b. a stationary sensor node comprising a light sensor configured to detect the temporal projector light signal and generate a sensor signal and a transmitter configured to transmit a sensor node identifier and a position code generated based on the sensor signal;
    c. a receiver mounted on the mobile robot and configured to receive the sensor node identifier and the position code from the transmitter; and
    d. an onboard computer mounted on the mobile robot and operatively coupled to the projector and the receiver, wherein the onboard computer is configured to receive the sensor node identifier and the position code from the receiver and to determine a location information of the mobile robot based on the received sensor node identifier and the position code.

2. The indoor localization and navigation system of claim 1, wherein the stationary sensor node is rigidly mounted on a ceiling.

3. The indoor localization and navigation system of claim 1, wherein the onboard computer of the mobile robot determines the location information of the mobile robot by identifying a projector pixel corresponding to the position code.

4. The indoor localization and navigation system of claim 1, wherein the onboard computer of the mobile robot determines the location information of the mobile robot by querying a remote server using the received sensor node identifier and receiving, from the remote server, a node position corresponding to the received sensor node identifier.

5. The indoor localization and navigation system of claim 4, wherein the onboard computer of the mobile robot determines the location information of the mobile robot by combining the node position received from the remote server with a second position generated based on the position code.

6. The indoor localization and navigation system of claim 1, wherein the sensor node comprises a second light sensor configured to detect the temporal projector light signal and generate a second sensor signal, wherein the transmitter is further configured to transmit a second position code generated based on the second sensor signal and wherein the onboard computer of the mobile robot determines the location information of the mobile robot by identifying a second projector pixel corresponding to the second position code.

7. The indoor localization and navigation system of claim 1, wherein the sensor node comprises a second light sensor configured to detect the temporal projector light signal and generate a second sensor signal, wherein the transmitter is further configured to transmit a second position code generated based on the second sensor signal and wherein the onboard computer of the mobile robot determines an orientation information of the mobile robot based on the position code and the second position code.

8. The indoor localization and navigation system of claim 1, wherein the temporal projector light signal projected by the project comprises a plurality of sequential light pulses encoding pixel coordinates of the each pixel of the projector.

9. The indoor localization and navigation system of claim 1, wherein the onboard computer of the mobile robot is configured to calculate a trajectory error of the mobile robot and issue a guidance command based on a proportional-integral-derivative (PID) calculation performed using the calculated trajectory error.

10. The indoor localization and navigation system of claim 1, wherein the onboard computer is configured to maintain a map comprising topological relation of a plurality of stationary sensor nodes.

11. The indoor localization and navigation system of claim 10, wherein the onboard computer is configured to issue a guidance command based on the map and a goal sequence information.

12. The indoor localization and navigation system of claim 11, wherein the goal sequence information comprises an ordered plurality of stationary sensor nodes.

13. The indoor localization and navigation system of claim 11, further comprising a server executing a global navigation module for building the goal sequence information and transmitting the goal sequence information to the onboard computer of the robot.

14. The indoor localization and navigation system of claim 1, wherein the projector and the receiver are positioned on a top of the mobile robot.

15. The indoor localization and navigation system of claim 1, wherein the stationary sensor node further comprises a second light sensor configured to detect the temporal projector light signal and generate a second sensor signal and wherein the transmitted position code is additionally based on the second sensor signal.

16. The indoor localization and navigation system of claim 15, wherein the stationary sensor node further comprises a third light sensor configured to detect the temporal projector light signal and generate a third sensor signal and wherein the transmitted position code is additionally based on the third sensor signal.

17. An indoor localization and navigation method for a mobile robot, the method comprising:
   a. using a projector comprising a plurality of pixels, the projector mounted on the mobile robot to project a temporal projector light signal, wherein the temporal projector light signal is encoded, for each pixel of the projector, with an information segment comprising the pixel coordinates of the each pixel of the projector;
   b. using a stationary sensor node comprising a light sensor for detecting the temporal projector light signal and generate a sensor signal and a transmitter for transmitting a sensor node identifier and a position code generated based on the sensor signal;
   c. using a receiver mounted on the mobile robot to receive the sensor node identifier and the position code from the transmitter; and
   d. using an onboard computer mounted on the mobile robot and operatively coupled to the projector and the receiver, to receive the sensor node identifier and the position code from the receiver and to determine a location information of the mobile robot based on the received sensor node identifier and the position code.

18. The indoor localization and navigation method of claim 17, wherein the stationary sensor node is rigidly mounted on a ceiling.

19. The indoor localization and navigation method of claim 17, wherein the onboard computer of the mobile robot determines the location information of the mobile robot by identifying a projector pixel corresponding to the position code.

20. A non-transitory computer-readable medium embodying a set of instructions implementing an indoor localization and navigation method for a mobile robot, the method comprising:
   a. using a projector comprising a plurality of pixels, the projector mounted on the mobile robot to project a temporal projector light signal, wherein the temporal projector light signal is encoded, for each pixel of the projector, with an information segment comprising the pixel coordinates of the each pixel of the projector;
   b. using a stationary sensor node comprising a light sensor for detecting the temporal projector light signal and generate a sensor signal and a transmitter for transmitting a sensor node identifier and a position code generated based on the sensor signal;
   c. using a receiver mounted on the mobile robot to receive the sensor node identifier and the position code from the transmitter; and
   d. using an onboard computer mounted on the mobile robot and operatively coupled to the projector and the receiver, to receive the sensor node identifier and the position code from the receiver and to determine a location information of the mobile robot based on the received sensor node identifier and the position code.

* * * * *